(12) United States Patent
Li (10) Patent No.: US 8,675,669 B2
(45) Date of Patent: Mar. 18, 2014

(54) POLICY HOMOMORPHIC NETWORK EXTENSION

(75) Inventor: Li Li, Edison, NJ (US)

(73) Assignee: Alcatel Lucent, Paris (FR)

(*) Notice: Subject to any disclaimer, the term of this patent is extended or adjusted under 35 U.S.C. 154(b) by 409 days.

(21) Appl. No.: 12/984,883

(22) Filed: Jan. 5, 2011

(65) Prior Publication Data

US 2012/0170581 A1 Jul. 5, 2012

(51) Int. Cl.
*H04L 12/28* (2006.01)
(52) U.S. Cl.
USPC ........... 370/401; 370/230; 370/392; 370/409; 709/222; 709/238; 726/4
(58) Field of Classification Search
None
See application file for complete search history.

(56) References Cited

U.S. PATENT DOCUMENTS

| 2011/0090815 A1* | 4/2011 | Gundavelli et al. ........... 370/253 |
| 2011/0113142 A1* | 5/2011 | Rangegowda et al. ........ 709/227 |
| 2011/0200045 A1* | 8/2011 | Baehre ......................... 370/392 |

* cited by examiner

*Primary Examiner* — Ayaz Sheikh
*Assistant Examiner* — Nicholas Sloms
(74) *Attorney, Agent, or Firm* — Kramer Amado P.C.

(57) ABSTRACT

Various exemplary embodiments relate to a method and related network node including one or more of the following: establishing a proxy device; establishing a connection between the proxy device and a local network device associated with the network group; configuring the local network device to: forward, to the proxy device, a first subset of received packets via the connection, wherein the first subset of received packets comprises packets destined for the remote node, and forward a second subset of received packets as though the second subset of packets were received directly from the remote node, wherein the second subset of received packets comprises packets received from the proxy device via the connection; and configuring the proxy device to: forward packets received from the local network device via the connection toward the remote node, and forward packets received from the remote node to the local network device via the connection.

20 Claims, 6 Drawing Sheets

POLICY HOMOMORPHIC NETWORK EXTENSION

TECHNICAL FIELD

Various exemplary embodiments disclosed herein relate generally to network extension.

BACKGROUND

With the advent of remote data center applications such as cloud computing, extension of existing networks to utilize such remote resources is quickly becoming one of the major issues surrounding this new technology. Various enterprise networks tap these resources during periods of high load on local devices. In some situations, a network may "scale out" to the remote data center and designate remote nodes to offload some of the processing performed by the local devices. In other situations, a network may "relocate" a device or process to the remote data center entirely. Regardless of the methods used, many systems will utilize remote devices to perform functions as if they were part of the local network.

While simple and unsophisticated networks may easily make use of remote resources through via basic delegation algorithms and communication channels, more complex networks present additional considerations for such extension. For example, many enterprise networks may specify various security policies for application to traffic within the network. According to such policies, traffic associated with a particular device or group of devices may be required to pass through a firewall, be encrypted, or comply with various other policies. When adding devices from a remote data center, it becomes difficult to ensure that such policies will be enforced as intended.

A network administrator may attempt to ensure policy enforcement through various means. For example, an administrator may use additional policy enforcement nodes to ensure that traffic being routed through the remote data center passes through at least one such node. This approach, however, may require considerable manual configuration, which may be undesirable in a system that dynamically makes use of remote resources. Further, it may be difficult and/or resource-intensive to ensure that the proper policies are being enforced on each type of traffic passing through the additional policy devices.

SUMMARY

In light of the present need for a method and system for ensuring proper policy enforcement with regard to remote data center traffic, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various exemplary embodiments provide a network that may dynamically utilize remote resources while ensuring policy homomorphism. Such a network may include a proxy device that is configured to receive and forward traffic between remote resources and a local device. Through use of the proxy device, traffic associated with a remote resource may be forced to traverse at least a portion of the same path that would be traversed if the resource were local. Such path may include any policy enforcement nodes or other devices that similar local traffic passes through, thereby ensuring the same policies are applied to the remote resource traffic.

Various exemplary embodiments relate to a method and related network node including one or more of the following: establishing a proxy device for the remote node; establishing a first connection between the proxy device and a local network device associated with the network group; configuring the local network device to: forward, to the proxy device, a first subset of received packets via the first connection, wherein the first subset of received packets comprises packets destined for the remote node, and forward a second subset of received packets as though the second subset of packets were received directly from the remote node, wherein the second subset of received packets comprises packets received from the proxy device via the first connection; and configuring the proxy device to: forward packets received from the local network device via the first connection toward the remote node, and forward packets received from the remote node to the local network device via the first connection.

Various exemplary embodiments relate to a network system including one or more of the following: a plurality of local network devices comprising: a local policy node, and a local proxy node; a plurality of remote network devices; and a network group including a local endpoint of the plurality of local network devices and a remote endpoint of the plurality of remote network devices, wherein: a first packet destined for the local endpoint is forwarded along a first path through the network system, wherein the first path includes the local policy node, and a second packet destined for the remote endpoint is forwarded along a second path through the network system, wherein the second path includes the local policy node and the local proxy node.

Various exemplary embodiments relate to a method and related network node including one or more of the following: determining a neighbor node of the network node; determining a first port of the neighbor node associated with the network node; establishing a first link between the neighbor node and a second port of a proxy device; and configuring the first port of the neighbor node to correspond to the first link; and configuring the second port of the proxy device to correspond to the network group.

It should be apparent that, in this manner, various exemplary embodiments ensure policy homomorphism during and after network extension. In particular, by providing that traffic destined for a remote resource pass through a local proxy device, a network may ensure that the traffic is processed by the same local devices that would process similar local traffic.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
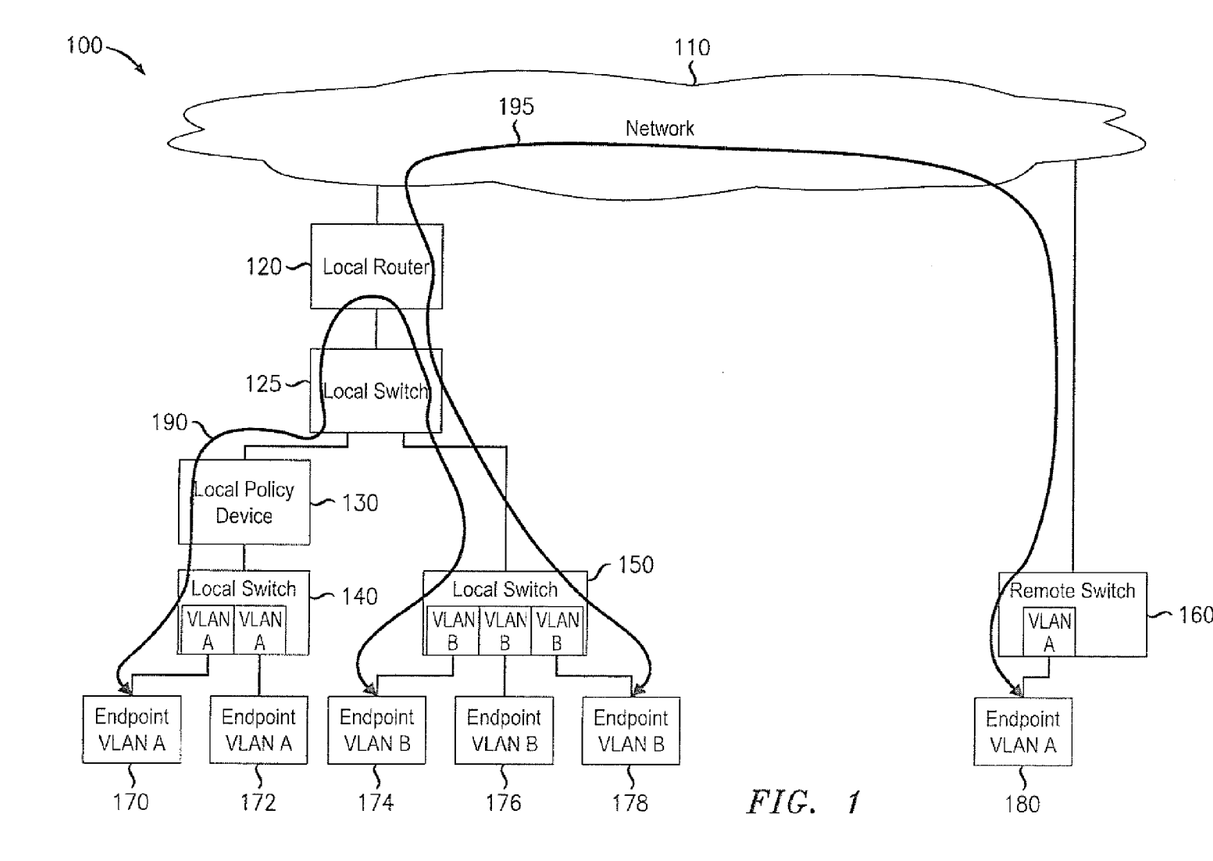
FIG. 1 illustrates an exemplary system utilizing remote resources.

FIG. 1 illustrates an exemplary system 100 utilizing remote resources. System 100 may include a plurality of types of devices such as, for example, layer 3 routers, layer 2 switches, servers, and/or personal computers. The various devices of system 100 may communicate according to various protocols such as, for example, Ethernet, Internet Protocol (IP), transmission control protocol (TCP), and/or user datagram protocol (UDP). Various devices may be associated with one another as part of a network group such as, for example, a virtual local area network (VLAN).

System 100 may include a network 100, a local router 120, a first local switch 125, a local policy device 130, a second local switch 140, a third local switch 150, a remote switch 160, and a plurality of endpoints 170, 172, 174, 176, 178, 180. It should be apparent that system 100 is intended to be illustrative of an environment for implementation of the methods and systems described herein, and that numerous variations are possible. For example, various systems may include additional or fewer routers, switches, and/or endpoints. Further, various devices may be connected in different manners and located in different positions with respect to the network topology.

Network 110 may be any network of devices capable of providing a communication channel between a local network and a remote data center. Accordingly, network 110 may include a circuit-switched network and/or a packet-switched network. In various embodiments, network 110 may be the Internet.

Local policy node 130 may be any device through which certain traffic is desired to be routed. According to various embodiments, local policy node 130 may enforce particular network policies for differing types of traffic. For example, system 100 may be designed such that traffic destined for endpoints within a particular VLAN must pass through the local policy node 130. In various embodiments, local policy node 130 may include a firewall and/or a load balancer. System 100 may include numerous additional local policy nodes (not shown).

Local switch 140 may be a device for forwarding information to one or more other devices. For example, local switch 140 may be a layer 2 switch. Local switch 140 may further help to provide network group functionality by, for example, forwarding traffic according to the virtual local area network (VLAN) standard. In exemplary system 100, local endpoints 170, 172 may be associated with VLAN A. Remote endpoint 180 may also be associated with VLAN A. Local switch may be configured to forward any traffic marked as VLAN A traffic to one or more of endpoints 170, 172, 180. Any intermediate nodes between local switch 140 and endpoints 170, 172, 180 may be similarly configured in order to provide such functionality.

Similar to local switch 140, local switch 150 may be a device for forwarding information to one or more other devices. Accordingly, local switch 150 may be, for example, a layer 2 switch or layer 3 router. In various embodiments, local switch 140 and local switch 150 may be the same device. Local switch 150 may enable the use of network groups such as, for example, VLAN. In exemplary system 100, endpoints 174, 176, 178 belong to VLAN B. Local switch 150 may forward traffic marked as VLAN B traffic to one or more of endpoints 174, 176, 178.

Remote switch 160 may be a device for forwarding information to one or more other devices. Accordingly, remote switch 160 may be, for example, a layer 2 switch or layer 3 router. Remote switch 160 may be associated with a remote data center such as, for example, a cloud computing platform. Remote switch 160 may route traffic to resources currently being used by a local network. Remote switch may further cooperate with other nodes to enable network grouping functionality such as, for example, VLAN. In exemplary system 100, remote switch 160 may be configured to forward traffic associated with VLAN A to one or more endpoints 170, 172, 180.

System 100 may be designed such that certain policies are enforced depending on the type of traffic. For example, a network administrator may want to pass all traffic between VLAN A and VLAN B through a firewall to prevent unauthorized access to nodes on VLAN 100. As can be seen by traffic path 190, the network topology has been designed such that communication between fixed local nodes belonging to each respective VLAN will require that traffic pass through local policy device. Accordingly, such an exemplary policy may be enforced on all such traffic.

The same is not necessarily true for resources in a remote data center, such as endpoint 180. As can be seen by traffic path 195, traffic between endpoint 180, on VLAN A, and endpoint 178, on VLAN B, may bypass local policy device 130. Since local policy device may never see any of this traffic, the intended policy may not be enforced. Thus, when adding resources from a remote datacenter, network policies may not always be faithfully enforced.

Figure 2:
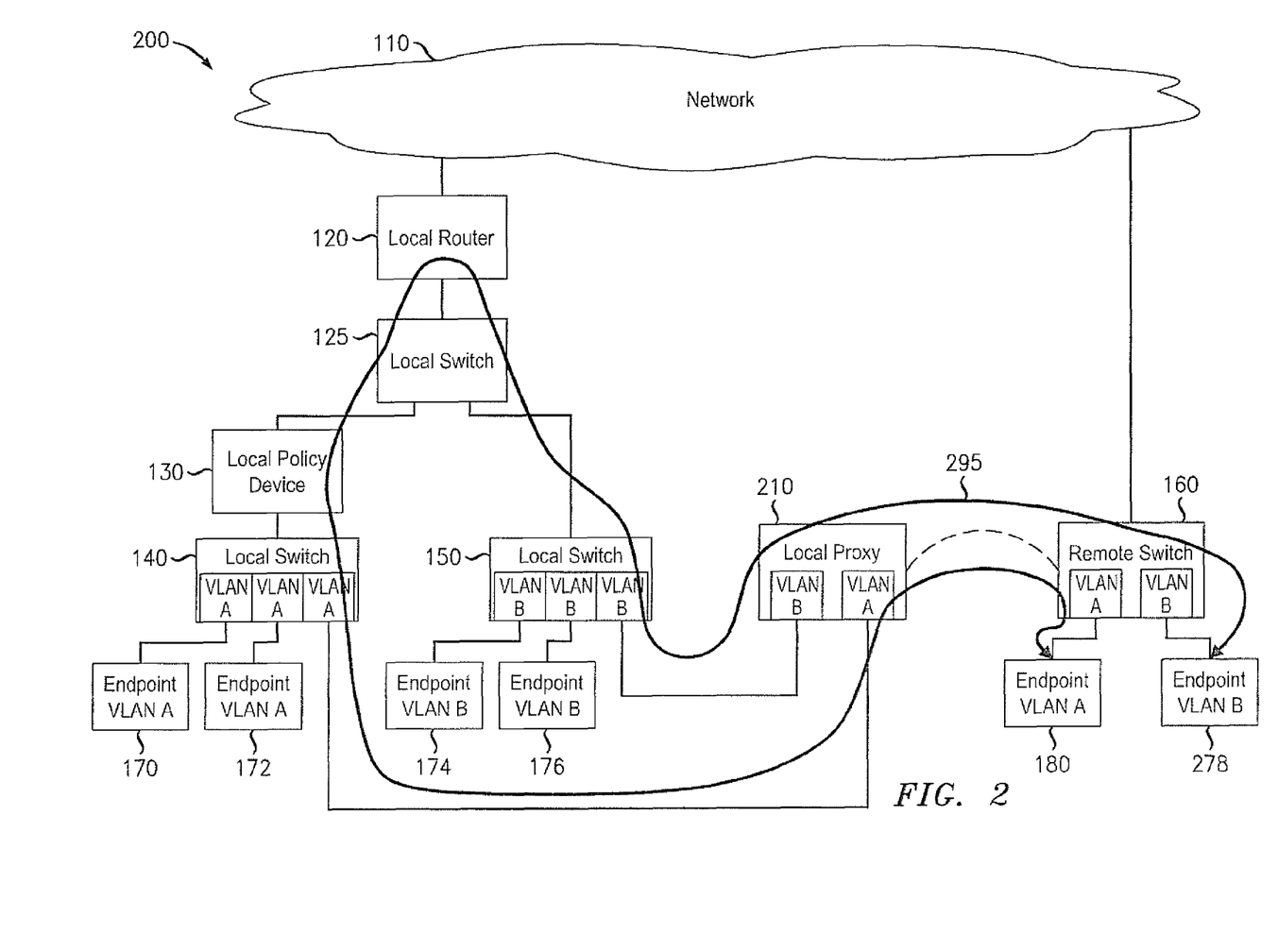
FIG. 2 illustrates an exemplary system utilizing remote resources and a proxy device.

FIG. 2 illustrates an exemplary system 200 utilizing remote resources and a proxy device. System 200 may be similar to system 100. System 200 may include a network 110, local router 120, local switch 125, local policy device 130, local switch 140, local switch 150, remote switch 160, endpoints 170, 172, 174, 176, 180, 278, and a local proxy 210.

Endpoint 278 may a remote resource that corresponds to endpoint 178 of system 100. For example, system 200 may have "relocated" endpoint 178 to the remote data center. As a result, endpoint 278 may now perform at least some functions previously associated with endpoint 178. Further, endpoint 278 may be associated with VLAN B. Remote switch 160 may further be configured to forward packets associated with both VLAN A and VLAN B toward the appropriate devices for those network groups.

Local proxy 210 may be a device adapted to receive and forward packets or other datagrams to their stated destinations. For example, local proxy 210 may be a layer 2 switch, a layer 3 router, or other device. Local proxy 210 may be connected to one or more local devices via one or more physical or logical connections. Local proxy 210 may further be connected to one or more remote devices via one or more physical or logical connections. Local proxy 210 may serve as a "stand-in" for remote resources, from the point of view of at least some other local network devices. Traffic destined for a remote resource may first be forwarded according to the path that would be applicable for a similar local device and then sent to the local proxy 210 which will forward the traffic to the remote resource.

In exemplary system 200, local proxy 260 may be connected to local switch 140, local switch 150, and remote switch 160 via one or more connections. Each connection may be a physical or logical connection. For example, the connection between local proxy 210 and remote switch 160 may be a MAC-in-MAC, VPLS, Pseudowire, IPSec tunnel, or another VLAN connection. Further, such connection may be implemented over network 110 and/or various other devices in the local network and/or remote data center.

Connections between local proxy 210 and other devices may also be associated with various network groups, such as VLANs. In system 200, the connection between local proxy 210 and local switch 140 may be associated with VLAN A. A connection between local proxy 210 and remote switch 160 may also be associated with VLAN A. Accordingly, traffic associated with VLAN A may be properly routed through local proxy 210 to local switch 140 and remote switch 160, as appropriate. Similarly, connections between local proxy 210 and each of local switch 150 and remote switch 160 may be associated with VLAN B such that VLAN B traffic may be appropriately forwarded through local proxy 210.

As shown by traffic path 295, endpoint 180 and endpoint 278 may communicate via local proxy 210. A packet originating from endpoint 278 may first be passed to remote switch 160 and then to local proxy 210. According to various embodiments wherein the connection between remote switch 160 and local proxy 210 is a logical connection, such a packet may traverse network 110 and a number of local devices such as, for example, local route 120 and/or local switch 125. Upon receiving the packet, local proxy may determine that since the packet is associated with VLAN B, it should be forwarded to local switch 150. In various embodiments wherein the connection between local switch 150 and local proxy 210 is logical, the packet may traverse one or more intermediate nodes such as, for example, local router 120 and/or local switch 125.

Once local switch 150 receives the packet from local proxy 210, it may forward the packet as if it were received directly from a local endpoint such as endpoints 174, 176. Local switch 150 may determine that the packet is destined for a VLAN A device and forward the packet toward local switch 140 via a number of intermediate nodes. As can be seen in FIG. 2, the packet is passed by local policy device 130 to local switch 140. Local policy device 130 may therefore enforce any policies configured for such traffic.

Local switch 140 may then receive the packet and determine that the packet is associated with VLAN A. Local switch 140 may subsequently transmit the packet to one or more VLAN A devices, including local proxy 210. As before, in various exemplary embodiments wherein the connection between local switch 140 and local proxy 210 is logical, the packet may be passed via one or more intermediate nodes such as, for example, local policy device 130, local switch 125, and/or local router 120. Local proxy 210 may then determine that the packet is associated with VLAN A and pass the packet toward remote switch 160. Finally, remote switch 160 may pass the packet to endpoint 180. Thus, traffic between endpoint 180 and endpoint 278 is passed through local policy device 130 such that policies configured for such traffic at local policy device may be enforced.

Figure 3:
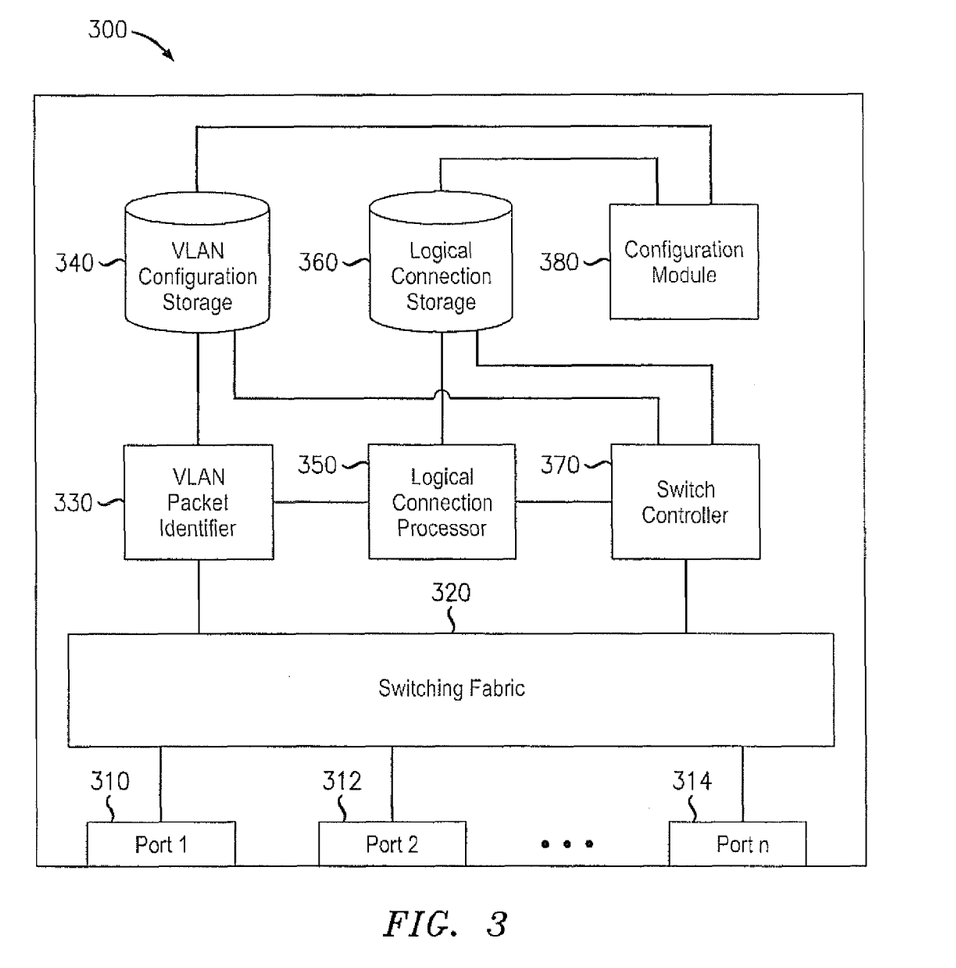
FIG. 3 illustrates an exemplary network node.

FIG. 3 illustrates an exemplary network node 300. Network node 300 may correspond to one or more devices in system 100 and/or system 200. Accordingly, network node 200 may be a layer 2 switch, a layer 3 router, a policy device, and/or a proxy device. It will be apparent that network node 300 may include numerous additional components (not shown) to provide various functionalities associated with such devices. Network node 300 may include a plurality of ports 310, 312, 314, switching fabric 320, VLAN packet identifier 330, VLAN configuration storage 340, logical connection processor 350, logical connection storage 360, switch controller 370, and configuration module 380.

Plurality of ports 310, 312, 314 may include a plurality of interfaces comprising hardware and/or executable instructions encoded on a machine-readable storage medium configured to send and receive packets from other network devices. Ports 310, 312, 314 may each be attached to a similar port of another network device, thereby enabling communication between node 300 and such other devices.

Switching fabric 320 may include hardware and/or executable instructions on a machine readable storage medium configured to redirect incoming packets from an incoming port to an appropriate outgoing port. Such packet forwarding may be accomplished according to control signals such as those asserted by switch controller 170, as will be described in further detail below. In this manner, packets may be routed through node 300 toward their destination.

VLAN packet identifier 330 may include hardware and/or executable instructions on a machine-readable storage medium configured to inspect each incoming packet and determine to which VLAN the packet belongs. For example, VLAN packet identifier 330 may read a VLAN tag from the packet and then retrieve configuration information for the VLAN tag from VLAN configuration storage. Such configuration information may include an indication of which ports 310, 312, 314 are associated with the VLAN tag. VLAN packet identifier may then forward the packet and configuration information to logical connection processor 350.

VLAN configuration storage 340 may be any machine-readable medium capable of storing configuration information for VLANs implemented through node 300. For example, VLAN configuration storage 340 may store a set of ports associated with each implemented VLAN, including the default VLAN. Accordingly, VLAN configuration storage 340 may include a machine-readable storage medium such as read-only memory (ROM), random-access memory (RAM), magnetic disk storage media, optical storage media, flash-memory devices, and/or similar storage media. In various embodiments, network groups other than VLAN may be used. In such embodiments, configuration data useful for implementing such groups is stored in VLAN configuration storage 340. Modifications useful in providing such network group functionality will be apparent to those of skill in the art.

Logical connection processor 350 may include hardware and/or executable instructions on a machine-readable storage medium configured to determine, for each packet, whether the packet should be forwarded over a logical connection. For example, logical connection processor 350 may read VLAN configuration information passed by VLAN packet identifier 330 to determine whether the packet should be forwarded over any logical connections. In various embodiments, logical connection processor may simply determine whether any ports in the set of ports correspond to logical connections. Logical connection processor may then perform further processing on the packet to enable transmission via the logical connection. For example, if the logical connection is a MAC-in-MAC connection, logical connection processor 350 may encapsulate the packet in an additional MAC frame for transmission to the other end of the logical connection. Alternative processing necessary or useful in implementing various other logical connections according to different standards will be apparent to those of skill in the art. Logical connection processor 350 may then pass the processed and/or unprocessed packets to switch controller 370.

Logical connection storage 360 may be any machine-readable medium capable of storing configuration information of logical connections between node 300 and other devices. For example, logical connection storage 360 may store data for implementing logical connections according to VPLS, Pseudowire, IPSec tunneling, and/or MACinMAC. In various embodiments, additional VLANs may be created to provide such logical connections. Logical connections may be associated with a logical port number for use in switching packets over the logical connection. Accordingly, logical connection storage 360 may include a machine-readable storage medium such as read-only memory (ROM), random-access memory (RAM), magnetic disk storage media, optical storage media, flash-memory devices, and/or similar storage media. Logical connection storage 360 may be an independent storage device within node 400 or may be the same as VLAN configuration storage 340.

Switch controller 370 may include hardware and/or executable instructions on a machine-readable storage medium configured to control the operation of the switching fabric to enable the proper forwarding of received packets. For example, switch controller 370 may read a destination of each packet, determine an appropriate outgoing port to reach such destination, and subsequently control switching fabric 320 to output the packet via the appropriate ports 310, 312, 314. Accordingly, switch controller 370 may have access to a forwarding table (not shown) or other means for associating a destination address with one or more output ports.

Switch controller 370 may further be adapted to forward packets according to a VLAN configuration. For example, switch controller 370 may receive an indication of one or more ports associated with a VLAN from VLAN packet identifier 330 and/or logical connection processor 350. Switch controller 370 may then control switching fabric 320 to output the packet via one or more ports 310, 312, 314 identified in the received indication. In various embodiments, switch controller 370 may output the packet via all ports associated with the VLAN. In various alternative embodiments, switch controller 370 may refrain from transmitting the packet via the arriving port.

In various embodiments, switch controller 370 may be adapted to forward packets according to a logical connection. Switch controller 370 may receive a packet from logical connection processor for transmission over a logical connection. Switch controller 370 may then inject the packet into switching fabric 320 for transmission over one or more ports associated with the logical connection.

Configuration module 380 may include hardware and/or executable instructions on a machine-readable storage medium configured to modify the contents of VLAN configuration storage 340 and/or logical connection storage 360. Configuration module 380 may include an interface for receiving commands from a network management system (NMS) (not shown). Alternatively, configuration module may receive packets including configuration commands via one or more ports 310, 312, 314. Configuration module 380 may interpret such commands and modify the various configuration data for node 300 accordingly. For example, configuration module 380 may receive a command indicating that port 1 should be associated with VLAN A. In response, configuration module 380 may update VLAN configuration storage 340 accordingly.

Figure 4:
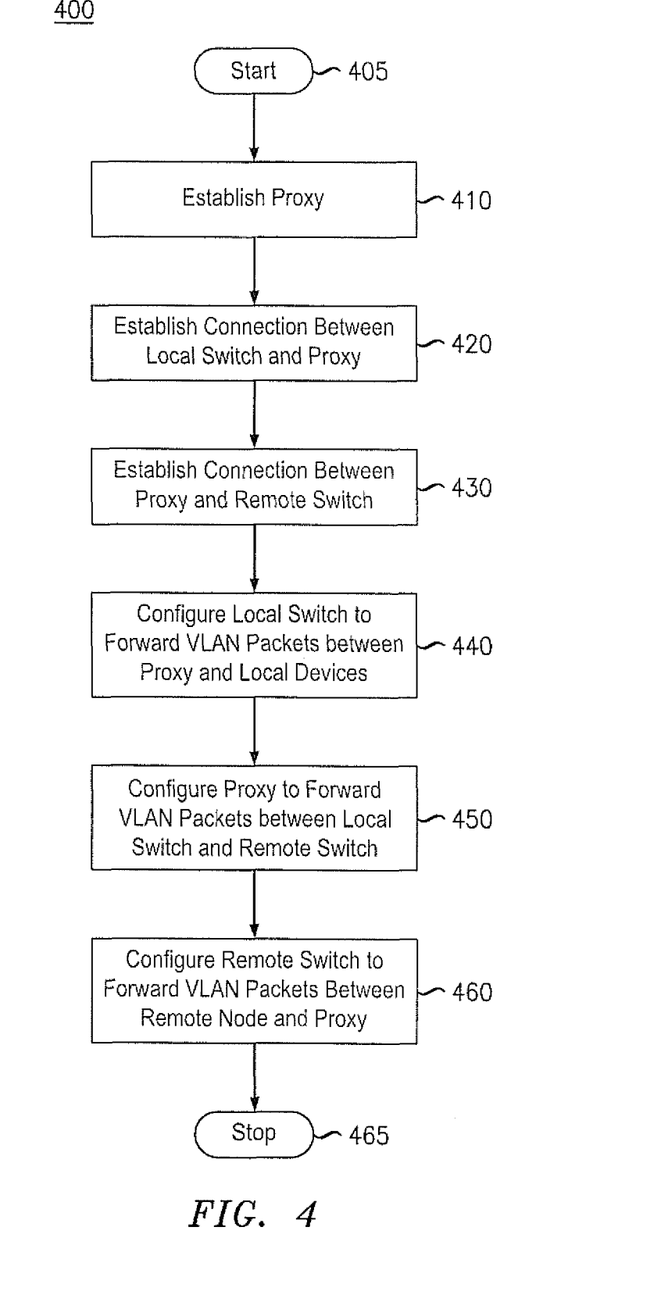
FIG. 4 illustrates an exemplary method for configuring a local network to use a remote resource.

FIG. 4 illustrates an exemplary method 400 for configuring a local network to use a remote resource. Method 400 may be performed by the components of one or more devices in a system such as system 100 or system 200. The network devices may cooperatively perform the steps of method 400. Method 400 may further be directed by a single node such as a network management system (NMS) (not shown) or other automatic reconfiguration device (not shown). Alternatively, one of the devices of system 100 and/or system 200 may be configured to direct the execution of method 400. For the sake of simplicity, method 400 will be described herein as directed by an NMS. Various modifications to support direction by other devices will be apparent to those of skill in the art. In directing the performance of method 400, the NMS may send various configuration commands to appropriate nodes for processing, for example, by a configuration module such as configuration module 380.

Method 400 may begin in step 405 and proceed to step 410 where the NMS establishes a proxy to be used for one or more remote resources. Step 410 may include selecting and configuring a device to be used as a proxy. Alternatively, step 410 may simply include selecting a device that is already acting as a proxy. Such selection may be based on various factors such as, for example, the VLAN to which the remote resource will be assigned, the devices that are physically connected to the potential proxy devices, and/or the current capacity of the potential proxy devices.

Method 400 may then proceed to step 420 where NMS may establish a connection between the selected proxy device and a local switch associated with the VLAN to which the remote resource will belong. This step may include determining whether there is already a physical link directly between the local switch and the proxy device. If so, no further action is necessary. Otherwise, the NMS may configure a logical connection between the two devices. Method 400 may then proceed to step 430 where NMS may similarly establish a connection between the proxy device and a remote switch connected to the remote resource. If there is already a direct link between the two devices, such link will be used. Otherwise, a logical connection will be configured on both devices to enable communication.

In step 440, the NMS may configure the local switch to forward VLAN traffic between the proxy device and other local network nodes. This step may include configuring the port associated with the proxy device to belong to the VLAN to which the remote resource will be assigned. Method 400 may then proceed to step 450 where the NMS may similarly configure the proxy device to forward VLAN traffic between the local switch and the remote switch. Accordingly step 450 may include identifying at least one port associated with each of the connections established in steps 420, 430, and configuring such ports to belong to the VLAN. Finally, in step 460, NMS may configure the remote switch to forward VLAN traffic between the remote resource and the proxy. Again, this step may include assigning appropriate ports to belong to the VLAN. Method 400 may then end in step 465.

As described above, various alternate network groups may be used. Modifications useful in providing such alternate groups will be apparent to those of skill in the art.

Figure 5:
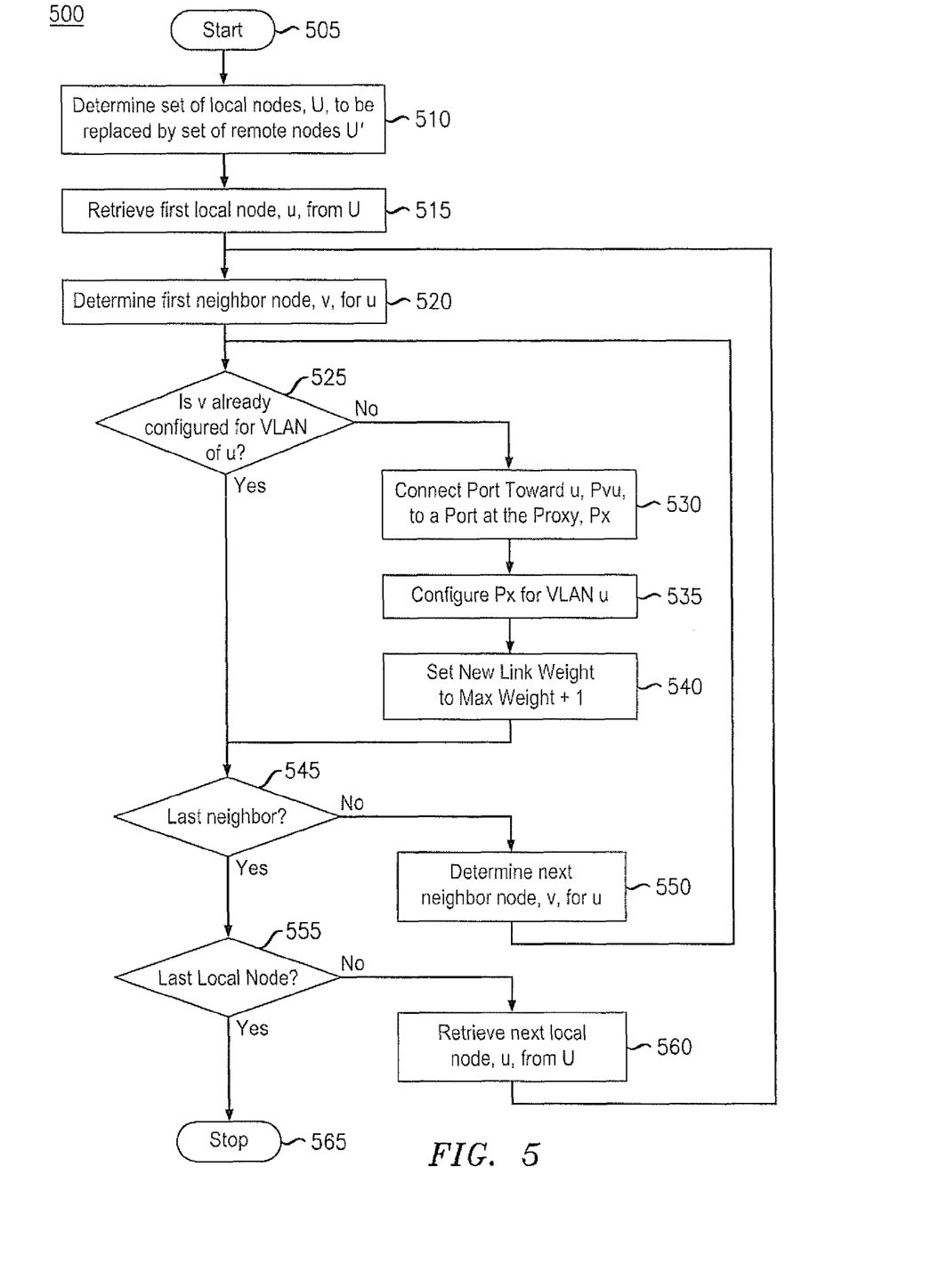
FIG. 5 illustrates an exemplary method for configuring a local network to relocate a local node to a remote data center.

FIG. 5 illustrates an exemplary method 500 for configuring a local network to relocate a local node to a remote data center. Method 500 may be performed by the components of one or more devices in a system such as system 100 or system 200. The network devices may cooperatively perform the steps of method 500. Method 500 may further be directed by a single node such as a network management system (NMS) (not shown) or other automatic reconfiguration device (not shown). Alternatively, one of the devices of system 100 and/or system 200 may be configured to direct the execution of method 500. For the sake of simplicity, method 500 will be described herein as directed by an NMS. Various modifications to support direction by other devices will be apparent to those of skill in the art. In directing the performance of method 500, the NMS may send various configuration commands to appropriate nodes for processing, for example, by a configuration module such as configuration module 380.

Method 500 may correspond to one or more steps of method 400 such as, for example, steps 410, 420, 440, and/or 450.

Method 500 may begin in step 505 and proceed to step 510 where NMS may determine a set of nodes, U, that are to be relocated to the remote data center. The relocated remote data center nodes may be represented as U'. Then in steps 515, 520, the NMS may determine a first local node, u, to process from U and a first neighbor of u, v, to reconfigure, respectively. In step 525, NMS may determine whether v has already been configured for the new network configuration by, for example, checking a locally stored Boolean indicating whether v has already been updated. If v has already been updated, method 500 may simply proceed to step 545. Otherwise, method 500 may proceed to step 530.

At step 530, NMS may configure v to identify the port toward the proxy device as the port toward u. Then, in step 535, NMS may configure the corresponding port at the proxy device to belong to the VLAN to which u belongs. Method 500 may then proceed to step 540 where NMS may configure the link between v and the proxy device to have a very large weight. For example, NMS may determine the maximum weight currently held by any link known to v, and subsequently set the link weight between the devices to such maximum weight plus one. In doing so, NMS may effectively discourage use of the link between the two devices for other types of traffic. Method 500 may then proceed to step 545.

In step 545, the NMS may determine whether there are any additional neighbors of u that have not been processed. If v is not the last. neighbor of u, the NMS may determine the next neighbor, v, to be processed in step 550 and then loop back to step 525. If all neighbors of u have been processed, method 500 will proceed to step 555.

In step 555, the NMS may determine whether all nodes in U have been processed. If not, the NMS will retrieve the next local node u, from U in step 560 and loop back to step 515 for further processing. Once all local nodes to be relocated have been processed, method 500 may end in step 565.

It should be noted that method 500 is directed toward the relocation of local nodes and/or the functions performed thereby to a remote data center. Various modifications to enable the simple addition of new remote resources will be apparent to those of skill in the art.

Figure 6:
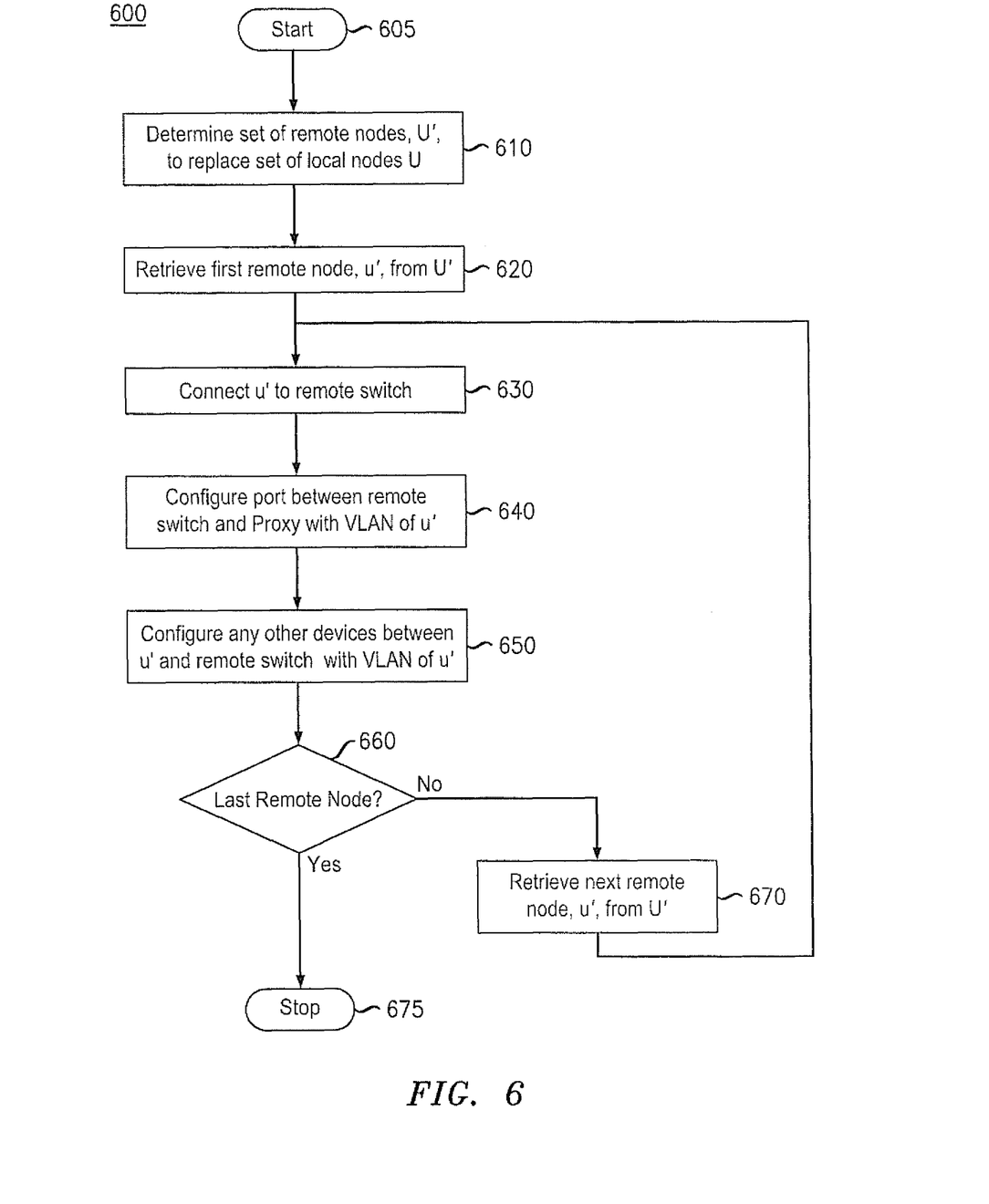
FIG. 6 illustrates and exemplary method for configuring a remote device to provide access to a remote resources by a local network.

FIG. 6 illustrates and exemplary method 600 for configuring a remote device to provide access to a remote resources by a local network. Method 600 may be performed by the components of one or more devices in a system such as system 100 or system 200. The network devices may cooperatively perform the steps of method 600. Method 600 may further be directed by a single node such as a network management system (NMS) (not shown) or other automatic reconfiguration device (not shown). Alternatively, one of the devices of system 100 and/or system 200 may be configured to direct the execution of method 600. For the sake of simplicity, method 600 will be described herein as directed by an NMS. Various modifications to support direction by other devices will be apparent to those of skill in the art. In directing the performance of method 600, the NMS may send various configuration commands to appropriate nodes for processing, for example, by a configuration module such as configuration module 380. Method 600 may correspond to one or more steps of method 400 such as, for example, steps 410, 430, 450, and/or 460.

Method 600 may begin in step 605 and proceed to step 610 where the NMS may determine the set of remote nodes, U', that are to replace a set of local nodes, U. Then, in step 620, the NMS may retrieve a first remote node, u', to process. Method 600 may then proceed to step 630 where the NMS may connect u' to a remote switch. For example, the NMS may configure a logical connection between the remote resource and the remote switch. Alternatively, if the remote node is already connected to the remote switch, the NMS may simply identify the port to which the remote node is connected.

Method 600 may then proceed to step 640 where the NMS may configure the ports between the local proxy and the remote switch to belong to the VLAN of u', thereby enabling the forwarding of VLAN traffic between the two devices. Then, in step 650, the NMS may configure any intermediate devices between the remote switch and u' to associate the appropriate ports with the VLAN of u'.

In step 660, the NMS may determine whether any remote nodes remain to be processed. If U' contains any unprocessed nodes, the NMS may retrieve the next node, u', to be processed and loops back to step 630. Once all remote resources, U', have been processed, method 600 may end in step 675.

It should be apparent that, in this manner, various exemplary embodiments ensure policy homomorphism during and after network extension. In particular, by providing that traffic destined for a remote resource pass through a local proxy device, a network may ensure that the traffic is processed by the same local devices that would process similar local traffic.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of connecting a remote endpoint node that is outside a local local area network (LAN) to a virtual network within a network, the method comprising:
   establishing a proxy device for the remote endpoint node, wherein the proxy device is local to a group of endpoint devices associated with the virtual network, wherein the local proxy device is connected to the local LAN through a local router and the remote endpoint node is connected to the local LAN through a remote switch, and wherein there is a local policy device on the local LAN which enforces policies for differing types of network traffic on the local LAN;

establishing a first connection between the proxy device and a local network device on the local LAN associated with the virtual network, wherein the local network device is local to the group of endpoint devices associated with the virtual network;

configuring the local network device such that the first connection belongs to the virtual network on the local network device, whereby the local network device is configured to:

forward, to the proxy device via the first connection, a first subset of received packets based on the first subset of received packets being associated with the virtual network, and forward a second subset of received packets to respective destinations of the second subset of packets, wherein the second subset of received packets comprises packets received from the proxy device via the first connection; and configuring the proxy device such that the first connection belongs to the virtual network on the proxy device, whereby the proxy device is configured to:

forward packets associated with the virtual network and received from the local network device via the first connection toward the remote endpoint node, and forward packets associated with the virtual network and received from the remote endpoint node to the local network device via the first connection.

2. The method of claim 1, wherein the first connection is a logical connection.

3. The method of claim 1, further comprising:
establishing a second connection between the proxy device and a remote network device;
wherein the step of configuring the proxy device comprises configuring the proxy device to:
forward packets received from the local network device via the first connection toward the remote endpoint node via the second connection, and
forward packets received from the remote endpoint node via the second connection toward the local network device via the first connection.

4. The method of claim 3, wherein the second connection is a logical connection.

5. The method of claim 1, wherein:
the network further comprises a traffic management device that processes packets originating outside the virtual network and forwards the packets to the network device; and
packets received at the network device from the proxy device and destined for outside nodes are forwarded to the traffic management device.

6. The method of claim 1, wherein the second subset of received packets comprises all packets destined for any node belonging to the virtual network.

7. The method of claim 1, wherein the virtual network is a virtual local area network (ULAN).

8. The method of claim 1, wherein the local network device and proxy device belong to the same local area network (LAN).

9. The method of claim 1, wherein the remote endpoint node belongs to a cloud computing system.

10. The method of claim 1, wherein the proxy device and local network device are connected to the Internet via another network device.

11. A non-transitory machine-readable storage medium encoded with instructions for execution by a network configuration device, the non-transitory machine-readable storage medium comprising:

instructions for establishing a proxy device for a remote endpoint node that is outside a local local area network (LAN), wherein the proxy device is local to a group of endpoint devices associated with a virtual network, wherein the local proxy device is connected to the local LAN through a local router and the remote endpoint node is connected to the local LAN through a remote switch, and wherein there is a local policy device on the local LAN which enforces policies for differing types of network traffic on the local LAN;

instructions establishing a first connection between the proxy device and a local network device on the local LAN associated with the virtual network, wherein the local network device is local to the group of endpoint devices associated with the virtual network;

instructions configuring the local network device such that the first connection belongs to the virtual network on the local network device, whereby the local network device is configured to:

forward, to the proxy device via the first connection, a first subset of received packets based on the first subset of received packets being associated with the virtual network, and forward a second subset of received packets to respective destinations of the second subset of, wherein the second subset of received packets comprises packets received from the proxy device via the first connection; and instructions configuring the proxy device such that the first connection belongs to the virtual network on the proxy device, whereby the proxy device is configured to:

forward packets associated with the virtual network and received from the local network device via the first connection toward the remote endpoint node, and forward packets associated with the virtual network and received from the remote endpoint node to the local network device via the first connection.

12. The non-transitory machine-readable storage medium of claim 11, wherein the first connection is a logical connection.

13. The non-transitory machine-readable storage medium of claim 11, further comprising:
instructions for establishing a second connection between the proxy device and a remote network device;
wherein the instructions for of configuring the proxy device comprise instructions for configuring the proxy device to:
forward packets received from the local network device via the first connection toward the remote endpoint node via the second connection, and
forward packets received from the remote endpoint node via the second connection toward the local network device via the first connection.

14. The non-transitory machine-readable storage medium of claim 13, wherein the second connection is a logical connection.

15. The non-transitory machine-readable storage medium of claim 12, further comprising instructions for establishing a tunnel connection between the proxy device and one of: the remote endpoint node and a remote switch attached to the remote endpoint node.

16. The non-transitory machine-readable storage medium of claim 11, wherein:

the network further comprises a traffic management device that processes packets originating outside the virtual network and forwards the packets to the network device; and packets received at the network device from the proxy device and destined for outside nodes are forwarded to the traffic management device.

17. The non-transitory machine-readable storage medium of claim 11, wherein the second subset of received packets comprises all packets destined for any node belonging to the virtual network.

18. The non-transitory machine-readable storage medium of claim 11, wherein the virtual network is a virtual local area network (ULAN).

19. The non-transitory machine-readable storage medium of claim 11, wherein the local network device and proxy device belong to the same local area network (LAN).

20. The non-transitory machine-readable storage medium of claim 11, wherein the remote endpoint node belongs to a cloud computing system.

\* \* \* \* \*

UNITED STATES PATENT AND TRADEMARK OFFICE
CERTIFICATE OF CORRECTION

PATENT NO. : 8,675,669 B2  Page 1 of 1
APPLICATION NO. : 12/984883
DATED : March 18, 2014
INVENTOR(S) : Li Li It is certified that error appears in the above-identified patent and that said Letters Patent is hereby corrected as shown below:

In the Claims

Column 11, Claim 7, line 62, replace the text "ULAN" with the text -VLAN-

Column 13, Claim 18, line 19, replace the text "ULAN" with the text -VLAN-

Signed and Sealed this
Twenty-seventh Day of May, 2014

Michelle K. Lee
*Deputy Director of the United States Patent and Trademark Office*